(12) United States Patent
Faibish et al.

(10) Patent No.: US 11,599,280 B2
(45) Date of Patent: Mar. 7, 2023

(54) DATA REDUCTION IMPROVEMENT USING AGGREGATED MACHINE LEARNING

(71) Applicant: EMC IP Holding Company LLC, Hopkinton, MA (US)

(72) Inventors: Sorin Faibish, Newton, MA (US); James M. Pedone, Jr., West Boylston, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 944 days.

(21) Appl. No.: 16/426,152

(22) Filed: May 30, 2019

(65) Prior Publication Data
US 2020/0379659 A1    Dec. 3, 2020

(51) Int. Cl.
*G06G 7/00*    (2006.01)
*G06F 3/06*    (2006.01)
*G06N 3/04*    (2023.01)

(52) U.S. Cl.
CPC .......... *G06F 3/0631* (2013.01); *G06F 3/0608* (2013.01); *G06F 3/0641* (2013.01); *G06F 3/0685* (2013.01); *G06N 3/0454* (2013.01)

(58) Field of Classification Search
CPC ...... G06V 20/20; G02B 23/12; G02B 25/001; G02B 27/0101; G02B 2027/013; G02B 2027/0138; G02B 2027/014; G02B 2027/0141; G02B 2027/0147; H04N 5/2257; H04N 5/2258; H04N 5/232939; H04N 5/332; F41G 1/38; F41G 3/145

USPC ................................................ 706/12, 16, 2
See application file for complete search history.

(56) References Cited

U.S. PATENT DOCUMENTS

| | | | |
|---|---|---|---|
| 10,681,313 B1* | 6/2020 | Day ..................... | G06V 40/172 |
| 2016/0110657 A1* | 4/2016 | Gibiansky ............. | G06N 20/00 |
| | | | 706/12 |
| 2016/0179395 A1* | 6/2016 | Fisher .................. | G06F 3/0688 |
| | | | 711/103 |
| 2017/0316487 A1* | 11/2017 | Mazed ............... | G06Q 30/0241 |
| 2018/0033053 A1* | 2/2018 | Barak .................. | H04L 67/535 |
| 2018/0330280 A1* | 11/2018 | Erenrich ............... | G06N 20/00 |
| 2019/0012619 A1* | 1/2019 | Moss ............... | G06Q 10/06398 |
| 2019/0244127 A1* | 8/2019 | Amado .................... | G09B 5/06 |
| 2019/0265890 A1* | 8/2019 | Barajas Gonzalez ....................... |  |
| | | | G06F 3/0659 |
| 2019/0347340 A1* | 11/2019 | Wilczynski .......... | G06F 16/256 |
| 2020/0050381 A1* | 2/2020 | Ainscow ............. | G06F 3/0649 |
| 2020/0065202 A1* | 2/2020 | McBride ............. | G06F 11/2069 |

(Continued)

*Primary Examiner* — Thuy N Pardo
(74) *Attorney, Agent, or Firm* — Krishnendu Gupta; Deepika Bhayana; Derek Lam

(57) ABSTRACT

A method system, and computer program product for improving data reduction using aggregate machine learning systems comprising receiving, by an aggregating machine learning system from one or more machine learning systems associated with a set of one or more storage arrays, a first set of output parameters indicative of performance metrics for the set of the one or more storage arrays, aggregating, by the aggregating machine learning system, the first set of output parameters, resulting in a second set of output parameters, and sending, from the aggregating machine learning system, at least one member of the second set of output parameters as an input to at least one of the one or more machine learning systems associated with the set of the one or more storage arrays.

20 Claims, 8 Drawing Sheets

(56) References Cited

U.S. PATENT DOCUMENTS

| | | | |
|---|---|---|---|
| 2020/0210356 A1* | 7/2020 | Dalmatov | G06F 13/20 |
| 2020/0218462 A1* | 7/2020 | d'Abreu | G06F 3/0688 |
| 2020/0311600 A1* | 10/2020 | Kulkarni | G06F 8/71 |
| 2020/0317113 A1* | 10/2020 | Dingli | B60Q 1/085 |
| 2020/0322178 A1* | 10/2020 | Wang | H04W 4/33 |
| 2020/0326537 A1* | 10/2020 | Busey | G02B 27/0101 |
| 2020/0349167 A1* | 11/2020 | Jansen | G06F 12/00 |
| 2021/0082094 A1* | 3/2021 | McCall | G06T 7/62 |

\* cited by examiner

DATA REDUCTION IMPROVEMENT USING AGGREGATED MACHINE LEARNING

BACKGROUND

Technical Field

This application relates to analyzing storage systems using machine learning systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system Input/Output (I/O) operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the back-end and front-end communication medium. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array (sometimes known as a "data storage" or "storage array"), may be used to store data for multiple applications.

Data storage systems are arrangements of hardware and software that typically include multiple storage processors coupled to arrays of non-volatile storage devices, such as magnetic disk drives, electronic flash drives, and/or optical drives. The storage processors service I/O operations that arrive from host machines. The received I/O operations specify storage objects that are to be written, read, created, or deleted. The storage processors run software that manages incoming I/O operations and performs various data processing tasks to organize and secure the host data stored on the non-volatile storage devices.

SUMMARY OF THE INVENTION

Embodiments of this disclosure relate to a method, system, and computer program product for improving data reduction using aggregate machine learning systems comprising receiving, by an aggregating machine learning system from one or more machine learning systems associated with a set of one or more storage arrays, a first set of output parameters indicative of performance metrics for the set of the one or more storage arrays, aggregating, by the aggregating machine learning system, the first set of output parameters, resulting in a second set of output parameters, and sending, from the aggregating machine learning system, at least one member of the second set of output parameters as an input to at least one of the one or more machine learning systems associated with the set of the one or more storage arrays. In some embodiments, the first set of output parameters include one or more of compression rate, deduplication rate, and aggregate data reduction rate. In some embodiments, the set of the one or more storage arrays include storage arrays of at least two different types. In some embodiments, the at least one of the values of the first set of output parameters reflects actual behavior of one or more applications associated with the set of the one or more storage arrays. In some embodiments, the first set of output parameters reflect an estimation by the one or more machine learning systems associated with the set of one or more storage arrays of the performance of the set of one or more storage arrays. Some embodiments further comprise adding an additional storage array to the set of the one or more storage arrays, wherein the additional storage array is associated with an additional machine learning system, wherein the additional machine learning system has an additional set of output parameters indicative of performance metrics for the associated additional storage array, and preventing the aggregating machine learning system from aggregating the additional set of output parameters until the at least one of the additional output parameters from the additional set of output parameters reaches a threshold condition. Some embodiments further comprise sending, from the aggregating machine learning system, at least one member of the second set of output parameters to a database.

BRIEF DESCRIPTION OF THE DRAWINGS

Features and advantages of the present technique will become more apparent from the following detailed description of exemplary embodiments thereof taken in conjunction with the accompanying drawings in which.

Figure 1:
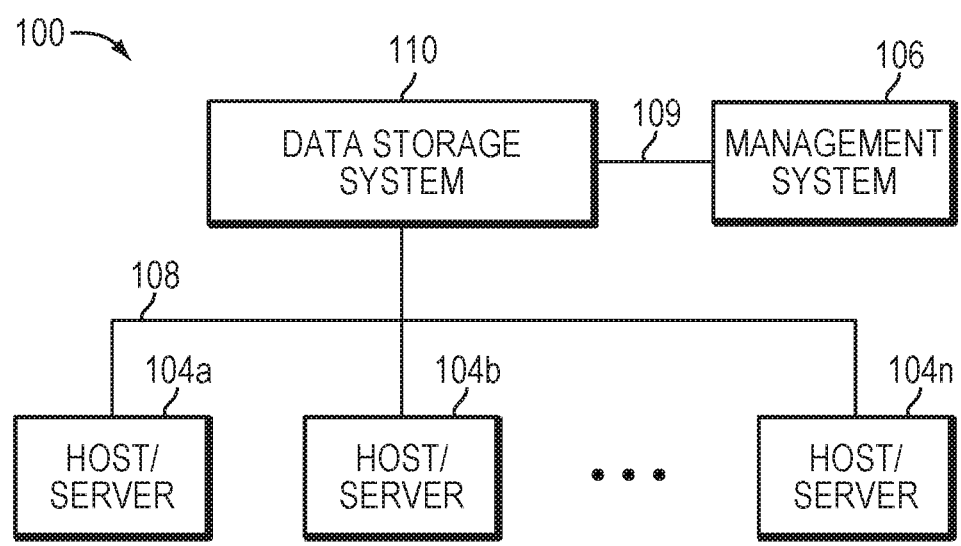
FIG. 1 is an example of an embodiment of an apparatus that may utilize the techniques described herein, in accordance with an embodiment of the present disclosure.

DETAILED DESCRIPTION OF
EMBODIMENT(S)

Described below is a technique for use in data reduction improvement using aggregated machine learning systems, which technique may be used to provide, among other things, receiving, by an aggregating machine learning system from one or more machine learning systems associated with a set of one or more storage arrays, a first set of output parameters indicative of performance metrics for the set of the one or more storage arrays, aggregating, by the aggregating machine learning system, the first set of output parameters, resulting in a second set of output parameters, and sending, from the aggregating machine learning system, at least one member of the second set of output parameters as an input to at least one of the one or more machine learning systems associated with the set of the one or more storage arrays.

Machine learning systems can be used to analyze the performance of storage arrays using performance data collected and stored in a cloud-based management application (CBMA), for example CloudIQ from Dell EMC Corporation. Data analytics and machine learning techniques can be used to predict the performance of a storage array, also sometimes known as a storage server or a server, based on historical data trained to the CBMA servers. Previously, this analysis was based on each storage array individually and allowed users to detect performance degradation of each individual storage array from the ideal measurement in quality assurance (QA) labs. But there was no collective performance being measured for a cluster or swarm of storage arrays. There was also no analysis of data reduction of each server compared to the QA lab measurements and there was no deduplication at the time of the application. For example, during QA tests in labs predefined benchmark data sets may be used that represent or reflect different application data but there may be limited types of data that are used for QA. The applications used by the users may be very different than what is tested. As a result, the data reduction characteristics of unknown applications may be different than the data sets used in QA and used to train a neural network (NN), also known as a machine learning system, to detect and recognize the data used for tests. It is difficult to test all data types and applications that may be used in the field. There is therefore a desire to adapt the NN to new unknown situations at the QA testing time workloads and data types.

One problem of the previous approaches is the difficulty in being able to detect changes in the behavior of applications that are running on flash-based storage arrays. Another problem with previous approaches is the difficulty in optimizing the storage access speed for flash-based storage arrays and in the process of such optimization, changing the data reduction characteristics of the flash-based storage arrays. In the previous approaches, over time the applications that use flash-based storage arrays are optimized for higher performance when accessing flash-based storage arrays and change the existing data reduction characteristics due to the way these applications take advantage of the highest Input/Output Operations Per Second (IOPS) and lower response times of flash-based storage arrays. As well, for users of existing flash-based storage arrays, there is a trend of collecting the aggregate population of storage arrays of a specific vendor—that is, all of the different types of storage arrays of a specific vendor, for example in various data logs or static displays, and presenting to users, data reduction trends that can be used to improve the individual flash-based arrays' data reduction methods. But these previous techniques require manual analysis of the data, for example the data logs. These previous techniques are also only applicable to storage arrays from a single vendor, yet users may have storage arrays from multiple vendors.

Storage arrays previously may use a machine learning system to predict the behavior of the array including estimated data reduction parameters including Compression Rate (CR), Deduplication Rate or Dedup Rate (DR), aggregate data reduction rate (DRR), and the like. Previously, machine learning may have been used for estimating the performance parameters of a storage array, the performance parameters having been defined/measured during the quality assurance (QA) of the storage array and used for training the machine learning system. Previously, the machine learning system, or neural network (NN) may have been used to estimate the current performance of an array as compared to datasets collected or measured during QA of the array. Related techniques are described in U.S. patent application Ser. No. 15/970,943 entitled "Predicting Performance of Applications Using Machine Learning Systems", filed May 4, 2018 and U.S. patent application Ser. No. 15/971,171 entitled "Analyzing Storage Systems Using Machine Learning Systems", filed May 4, 2018, both of whose contents and teachings are hereby incorporated by reference in their entirety.

By contrast, in at least some implementations in accordance with the techniques described below, a framework is provided to improve data reduction in storage arrays using aggregated machine learning. Thus, in at least one embodiment of the current technique, a user of a system is able to improve data reduction in storage arrays by receiving, by an aggregating machine learning system, output parameters from other machine learning systems associated with storage arrays, the output parameters indicative of performance metrics for a set of the one or more storage arrays, aggregating the output parameters, resulting in other output parameters, sending at least one of the output parameters as an input to at least one of the other machine learning systems associated with the storage arrays.

In at least some implementations in accordance with the technique as described herein, the use of the managing inline data compression in storage systems technique can provide one or more of the following advantages: improving—in some embodiments, continuously—storage utilization and performance by adjusting performance parameters such as CR, DR, DRR, and the like of storage arrays, detect earlier changes in the behavior of storage arrays and make recommendation for tuning storage array parameters to improve the DRR when large variations are detected compared to a training QA dataset, training new storage array behavior in the aggregate based on the aggregate behavior of the storage arrays, self-training of a swarm of storage arrays, correctly adjust the aggregate behavior of a swarm of storage arrays as new storage arrays are added.

FIG. 1 depicts an example embodiment of a system 100 that may be used in connection with performing the techniques described herein. The system 100, which may also be known as a computer system, includes one or more data storage systems 110, sometimes known as storage arrays or storage systems, connected to host systems 104a-104n through communication medium 108. The system 100 also includes a management system 106 connected to one or more data storage systems 110 through communication medium 109. In this embodiment of the computer system 100, the management system 106, and the N servers or hosts 104a-104n may access the data storage systems 110 for example, in performing input/output (I/O) operations, data requests, and other operations. The communication medium 108 may be any one or more of a variety of networks or other type of communication connections as known to those skilled in the art. Each of the communication mediums 108 and 109 may be a network connection, bus, and/or other type of data link, such as hardwire or other connections known in the art. For example, the communication medium 108 may be the Internet, an intranet, network or other wireless or other hardwired connection(s) by which the host systems 104a-104n may access and communicate with the data storage systems 110, and may also communicate with other components (not shown) that may be included in the computer system 100. In at least one embodiment, the communication medium 109 may be a LAN connection and the communication medium 108 may be an iSCSI or SAN through Fibre Channel connection.

Each of the host systems 104a-104n and the data storage systems 110 included in the computer system 100 may be connected to the communication medium 108 by any one of a variety of connections as may be provided and supported in accordance with the type of communication medium 108. Similarly, the management system 106 may be connected to the communication medium 109 by any one of variety of connections in accordance with the type of communication medium 109. The processors included in the host computer systems 104a-104n and management system 106 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 110 are described herein in more detail, and may vary with each particular embodiment. Each of the host computers 104a-104n, the management system 106 and data storage systems may all be located at the same physical site, or, alternatively, may also be located in different physical locations. In connection with communication mediums 108 and 109, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a connection switch or other switching equipment that may exist such as a phone line, a repeater, a multiplexer or even a satellite. In at least one embodiment, the hosts may communicate with the data storage systems over an iSCSI or Fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 104a-104n may issue a data request to the data storage systems 110 to perform a data operation. For example, an application executing on one of the host computers 104a-104n may perform a read or write operation resulting in one or more data requests to the data storage systems 110.

The management system 106 may be used in connection with management of the data storage systems 110. The management system 106 may include hardware and/or software components. The management system 106 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 106. The manager may also configure a data storage system, for example, by using management software to define a logical grouping of logically defined devices, referred to elsewhere herein as a storage group (SG), and restrict access to the logical group.

It should be noted that although element 110 is illustrated as a single data storage system, such as a single data storage array, element 110 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 110 may include one or more data storage systems. Each of the data storage systems may include one or more data storage devices, such as disks. One or more data storage systems may be manufactured by one or more different vendors. Each of the data storage systems included in 110 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 110.

It should be noted that each of the data storage systems may operate stand-alone, or may also included as part of a storage area network (SAN) that includes, for example, other components such as other data storage systems.

Each of the data storage systems of element 110 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 104a-104n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 110 of FIG. 1 is implemented using one or more data storage systems, each of the data storage systems may include code thereon for performing the techniques as described herein. In following paragraphs, reference may be made to a particular embodiment such as, for example, an embodiment in which element 110 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 110 may also include other components than as described for purposes of illustrating the techniques herein.

The data storage system 110 may include any one or more different types of disk devices such as, for example, an SATA disk drive, FC disk drive, and the like. Thus, the storage system may be made up of physical devices with different physical and performance characteristics (e.g., types of physical devices, disk speed such as in RPMs), Redundant Array of Independent Disks (RAID) levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, MA). In such an arrangement, typically the file based storage hardware operates as a front-end to the block based storage system such that the file based storage hardware and the block based storage system form a unified storage system.

Figure 2:
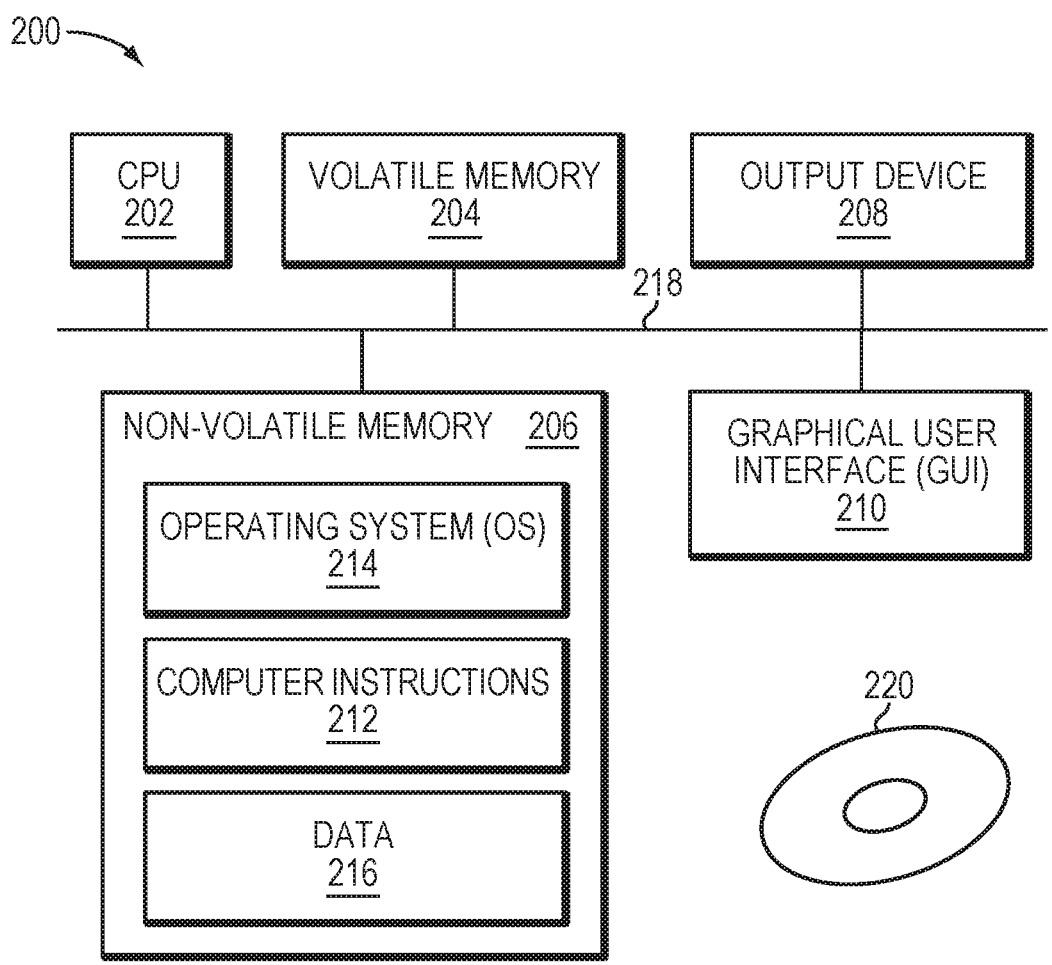
FIG. 2 is an example of a method embodied on a computer readable storage medium that may utilize the techniques described herein, in accordance with an embodiment of the present disclosure.

FIG. 2 depicts a block diagram of a computer 200 that can perform at least part of the processing described herein, according to one embodiment. The computer 200 may include a processor (also known as a central processing unit, or CPU) 202, a volatile memory 204, a non-volatile memory 206 (e.g., hard disk), an output device 208 and a graphical user interface (GUI) 210 (e.g., a mouse, a keyboard, a display, for example), each of which is coupled together by a bus 218. The non-volatile memory 206 may be configured to store computer instructions 212, an operating system 214, and data 216. In one example, the computer instructions 212 are executed by the processor 202 out of volatile memory 204. In one embodiment, an article 220 comprises non-transitory computer-readable instructions. In some embodiments, the computer 200 corresponds to a virtual machine (VM). In other embodiments, the computer 200 corresponds to a physical computer.

Figure 3:
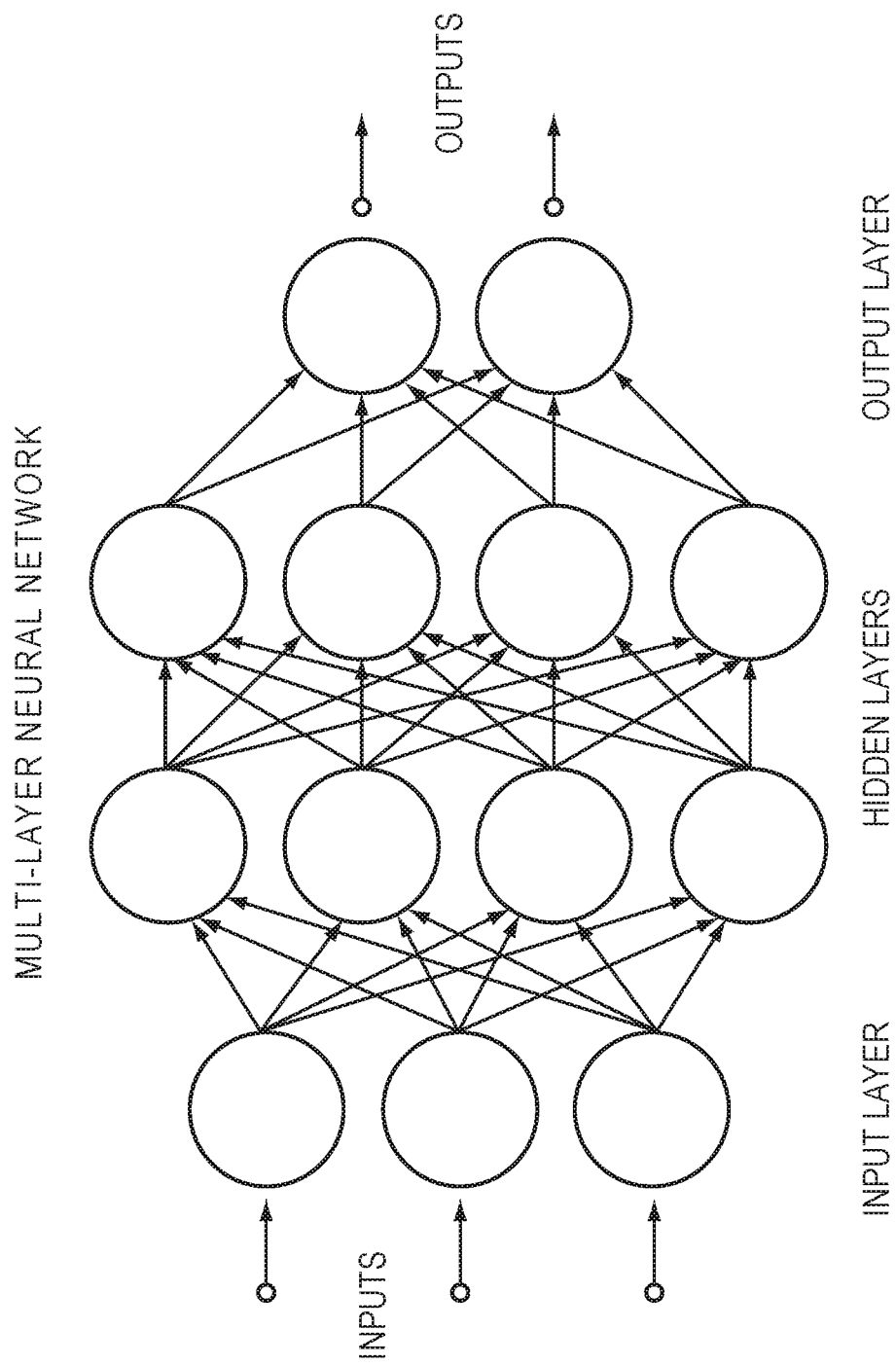
FIG. 3 is a simplified block diagram of an example system, in accordance with an embodiment of the present disclosure.

FIG. 3 depicts an example embodiment of a system that may be used in connection with performing the techniques described herein. In a storage system, multiple levels of logs and statistics may be collected from different components or modules (such as hardware or software) in the storage system. In some embodiments, each of the multiple levels of logs detect malfunctions or performance or the like of different modules in different software layers of the storage systems. This data may be used to train a machine learning system, such as a neural network, to predict or estimate the performance of the storage system. For example, the predictions or estimations may include one or more data reduction parameters, such as Compression Rate (CR), Deduplication (or Dedup) Rate (DR), or aggregate data reduction rate (DRR), or the like. In some embodiments, the neural network is a multi-layer neural network, as depicted in FIG. 3, also sometimes known as a graph of neurons synopsis matrix. Here, the neural network includes an input layer, which includes one or more input nodes (here, three). The neural network also includes one or more hidden layers (here, two), which each layer includes one or more nodes (here, four each). The neural network also includes one or more output nodes (here two). As used throughout, the terms "node" and "neuron" are used interchangeably, but it should be understood that a node is not necessarily limited to being implemented as a neuron. In some embodiments, the neural network may include a synopsis, which may be the connections between neurons' (i.e. nodes) links in the graph of the neurons. The neural network can be trained using data collected during QA tests including both the inputs that were sent to the neural network as well as the outputs of the storage array under these known data sets during a learning phase. The inputs include configuration parameter values, state of the cores utilization, for input and for output the IOPS achieved, latency, data reduction, and the like.

Figure 4:
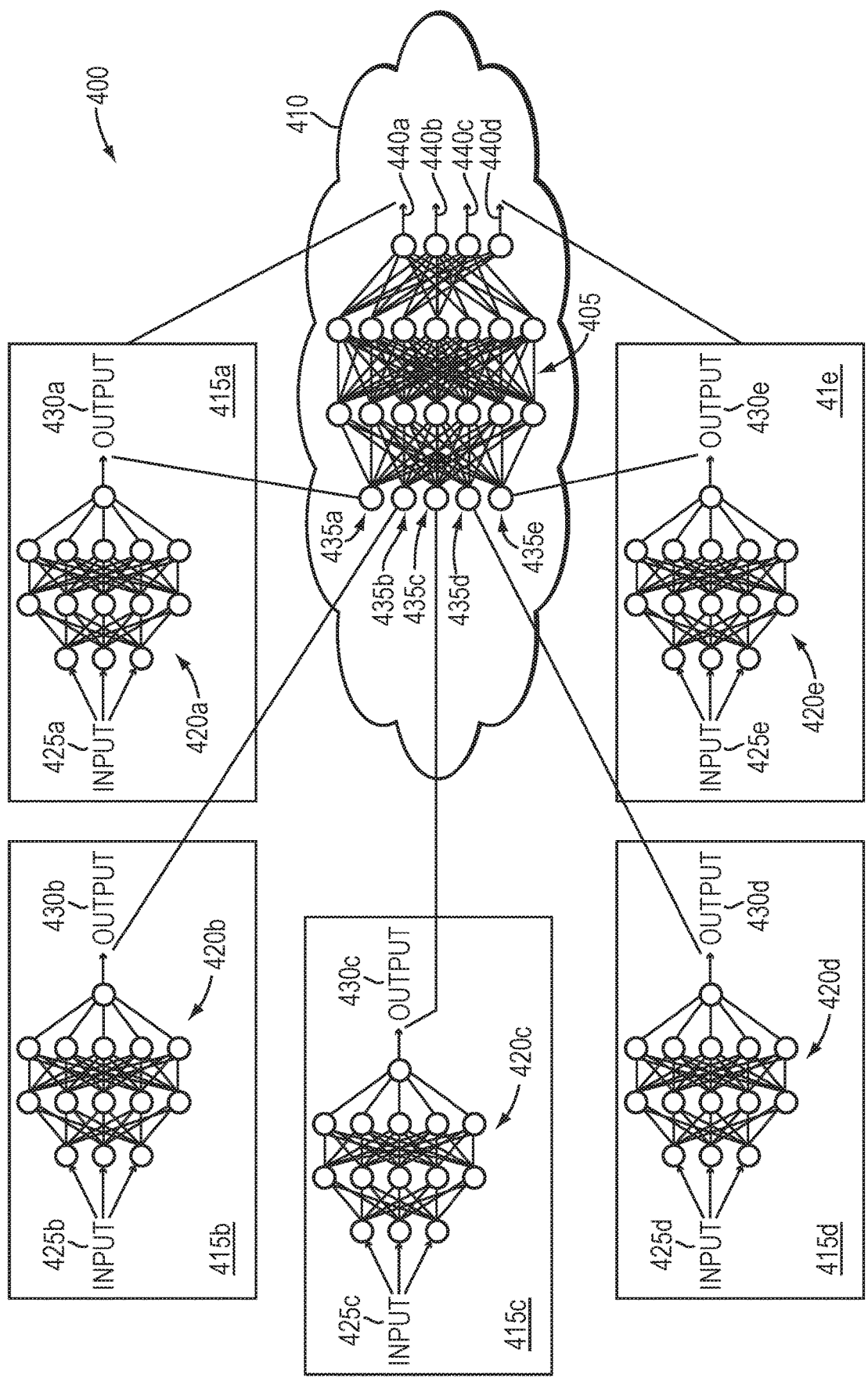
FIG. 4 is a simplified block diagram of an example system, in accordance with an embodiment of the present disclosure.

FIG. 4 depicts an example embodiment of a system 400 that may be used in connection with performing the techniques described herein. System 400 includes one or more data storages 415a-e, also sometimes collectively known as a swarm, which may be the data storage systems 110 as depicted in FIG. 1. A swarm may refer to a group of data storage systems that have similar characteristics, for example, all midrange storage systems, all flash storage systems, all hybrid storage systems, and the like. In some embodiments, the one or more data storages 415a-e include data storages of at least two different types; i.e. flash, hard disk, RAID. In some embodiments, the one or more data storages 415a-e are from different vendors. One or more of the data storages 415a-e have an associated machine learning system or neural network 420a-e—also known as a local neural network—which may be the graph of neurons synopsis matrix multi-layer neural network depicted in FIG. 3. Each of the local neural networks 420a-e have one or more input nodes 420a-e and output nodes 430a-e. In some embodiments, one or more of the local neural networks 420a-e receive parameters indicative of performance metrics, which may include data reduction parameters including some or all of CR, DR, or DRR, as input data at the one or more input nodes 420a-e. In some embodiments, one or more of the local neural networks 420a-e each predict the behavior of its associated data storage 415a-e including estimated data reduction parameters including some or all of CR, DR, or DRR. In some embodiments, the local neural networks 420a-e run on the associated data storage 415a-e directly. In some embodiments, the local neural networks run on one or more associated management systems, like the management system 106 as depicted in FIG. 1. In some embodiments, one or more of the output nodes 430a-e of the local neural networks 420a-e include the respective estimated data reduction parameters as output data, as described above. In some embodiments, one or more of the output nodes 430a-e of the local neural networks 420a-e include one or more of IOPS, latency, compression rate, deduplication rate, and the like. In some embodiments, system 400 includes a cloud 410 in which a neural network 405, sometimes known as an aggregate neural network, runs. In some embodiments, the aggregate neural network 405 is the graph of neurons synopsis matrix multi-layer neural network depicted in FIG. 3. The aggregate neural network includes one or more input nodes 435a-e and output nodes 440a-d. In some embodiments, the number of input nodes 435a-e of the aggregate neural network 405 corresponds to the number of data storages 415a-e that have an associated local neural network 420a-e, as shown in FIG. 4, though this is not necessarily so. In some embodiments, the number of output nodes 440a-e of the aggregate neural network 405 corresponds to the number of data storages 415a-e that have an associated local neural network 420a-e, though this is not necessarily so. In some embodiments, data that is input to the input nodes 435a-e of the aggregate neural network 405 includes the data that is output from the output nodes 430a-e of the local neural networks 420a-e. In some embodiments, the output data from a respective the respective output node 430a-e of the respective local neural networks 420a-e serves as input data received at the respective input nodes 435a-e of the aggregate neural network 405. In some embodiments, the aggregate neural network 405 processes the data received at the aggregate neural network's 405 input nodes 435a-e, resulting in output data at the aggregate neural network's 405 output nodes 440a-d. In some embodiments, at least some of the output data at the aggregate neural network's 405 output nodes 440a-d reflects the actual behavior of one or more applications associated with the one or more data storages 415a-e. For example, applications may be video or audio streaming applications, software builds, databases, virtual machines hosted on the storage array, and the like. In this way, the aggregate neural network 405 generates aggregate output data at the aggregate neural network's 405 output nodes 440a-d, based at least in part on the input data received at the at the aggregate neural network's 405 input nodes; input data that includes output data from the output nodes 430a-e of the one or more local neural networks a-e. In some embodiments, the output data at one or more of the output nodes 440a-d serves as input data received at the input nodes 425a-e of the local neural networks 420a-e. In some embodiments, the output data at one or more of the output nodes 440a-d of the aggregate neural network 405 serves as input to other instrumentalities; for example, a user interface which can display information about the output data from the output nodes 440a-d of the aggregate neural network 405, or as input to a database (e.g., a database that may include typical compression and deduplication characteristics of known and new unknown applications), and the like. In some embodiments, this process repeats one or more times. In this way, the aggregate neural network 405 will learn—in some embodiments, continuously—using the input data received at the input nodes 435a-e of the aggregate neural network 405 from the output nodes 430a-e of the local neural networks 420a-e. In this way, better training of the local neural networks 420a-e can be achieved by receiving input data from the output nodes 440a-e of the aggregate neural network 405. This learning is sometimes known as self-learning. In this way, the aggregate behavior of the data storages 415a-e can be used to detect earlier changes in the behavior of the data storages 415a-e and make a recommendation for tuning the local neural networks 420a-e to improve the DRR when large variations in the data characteristics of one or more of the data storages 415a-e are detected. For example, when the weights of the aggregate neural network synopsis change more than a small percent, for example, around 1%, it may show a large change in the data characteristics, for example, greater than around 10%. When large variations in the data characteristics are detected, the aggregate neural network will learn the outputs as new data sets and it will detect the new output that was learned next time a similar output is measured. Thus, small variations can be applied to the weights of the aggregate neural network nodes, with the result that the outputs of the aggregate neural network do not change more than the percent achieved when using training data sets.

In some embodiments, a user can be presented information based on the output data from the output nodes 440a-d of the aggregate neural network 405. In some embodiments, the user, in response to receiving the output data from the output nodes 440a-d of the aggregate neural network 405a indicative of a change in the behavior of the swarm (the data storages 415a-e), may request that updates, i.e. changes to the neural network model used inside the array code of the one or more of the local machine learning systems 420a-e reflecting new learned data, be sent from the cloud 410 to one or more of the data storages 415a-e, even for small variations in the aggregate behavior. For example, a variation of 10% in the input results in no change in the output is indicative of a problem and a need to retrain.

In some embodiments, prior to deploying the system 400, there is a period of initial learning by the system 400. In some embodiments, during the period of initial learning, the system 400 functions as described above, except the output data from the output nodes 440a-e of the aggregate neural network 405 is not sent to the input nodes 425a-e of the local neural networks 420a-e. In some embodiments, at least one of the output data from the output nodes 430a-e of the local neural networks 420a-e is a confidence level. In some embodiments, the aggregate neural network 405 has a confidence threshold, for example 80%, above which the aggregate neural network 405 performs data validation and verification. For example, one of the output nodes of the aggregate neural network 405 can be a confidence level that represents how close the output is compared to the output during a validation phase when training the neural network. Validation in the validation phase can be performed by feeding the neural network with trained data and then verifying that the output of the neural network for the test data is identical to the output used for training across all the data storages. By way of further explanation, validation can be performed by using new data sets not trained to the neural network and checking that the output from the neural network is similar to the data used for training. Verification can be using a set of sample data sets trained to the neural network and checking that the output is identical, or within some tolerance level, to what was trained. In some embodiments, the validation data sets use 10% of all the QA data generated for training. In some embodiments, verification uses about 10% of the trained data sets. In some embodiments, if the neural network is trained properly, the errors between the trained output and test output are 0, because the data was used for training. In this way, this reflects how well the neural network was trained. In some embodiments, the aggregate neural network 405 has a confidence threshold, for example 90%, above which the output data from the output nodes 440a-e of the aggregate neural network 405 is sent to the input nodes 425a-e of the local neural networks 420a-e, also known as enabling feedback. For example, during verification, the confidence level is checked to be above 90% (the confidence threshold); during validation, it is ensured that the confidence level is above 90%, and if it is not, the validation set is trained until the confidence level is above 90%. In another example, assuming that for a given storage array with a trained local neural network, but the inputs and outputs used for training are specific to a different storage array, yet the outputs of the local neural network are the same: e.g., IOPS, latency, DR, CR. The different local neural networks may have been trained by different types of inputs specific to the one storage array. Although the training sets may be different, the outputs are similar. In this way, the storage arrays can be ensured to have better or optimal performance for global metrics that are typical for storage arrays. In some embodiments, the one or more data storages 415a-e are deployed after enabling feedback, as shown above.

In some embodiments, at least one of the data storages 415a-e, for example data storage 415e, is added to the system 400 after the other data storages 415a-d. In some embodiments, this is done after the period of initial learning, and enabling feedback on the other data storages 415a-d. In some embodiments, the aggregate neural network 405 is prevented from aggregating the output data from the output nodes 430e from the local neural network 420e associated with the later added data storage 415e. In some embodiments, the aggregation prevention occurs by preventing the input data to the aggregate neural network 405 from influencing the output data from the aggregate neural network 405. For example, as shown above, the training data sets can be different, but the output data from the aggregate neural network 405 is the same. In some embodiments, the aggregate neural network 405 is prevented from having feedback enabled for the later added data storage 415e (as described above) until at least one of the output data from the output nodes 430e reaches a threshold condition, as described above. In another example, when there are large differences between the outputs of the local neural networks specific data can be marked or flagged as needing to be trained to the specific data storage that is different. In response to the at least one of the output data from the output nodes 430e reaching the threshold condition, the aggregate neural network 405 begins including the output data from the output nodes 430e from the local neural network 420e associated with the later added data storage 415e in the processing of the other output data from the other output nodes 430a-d from the local neural networks 420a-d, resulting in output data from the output nodes 440a-d of the aggregate neural network 405 being based at least partly on the output data from the output nodes 430a-e from the local neural networks 420a-e. In this way, the system 400 can keep running on the already added data storages 415a-d arrays even while training the later added data storage 415e.

Figure 5A:
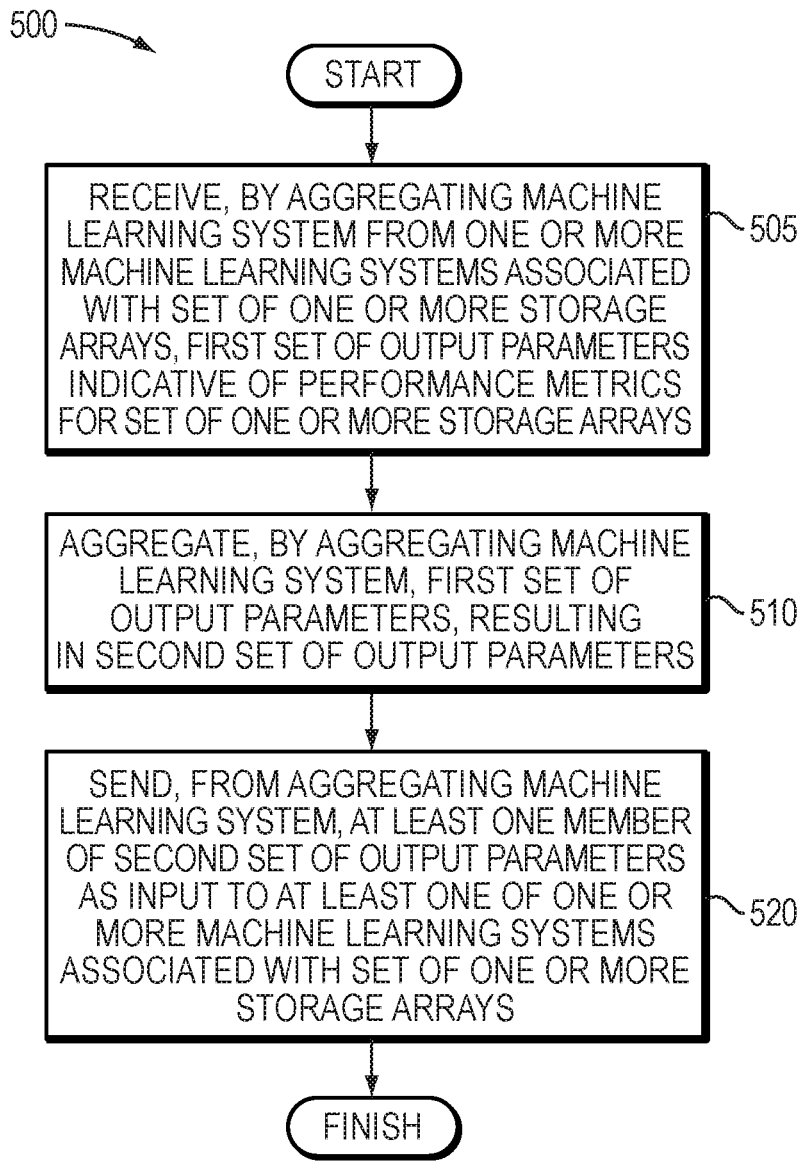
FIG. 5A is a flow diagram illustrating an example process, in accordance with an embodiment of the present disclosure.
Figure 5B:
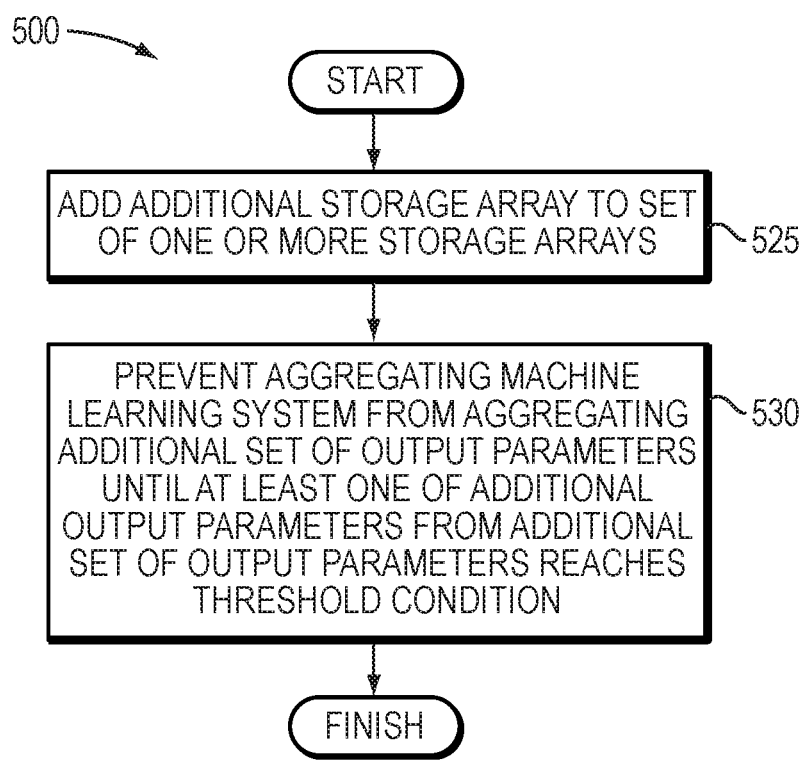
FIG. 5B is a flow diagram illustrating an example process, in accordance with an embodiment of the present disclosure.
Figure 5C:
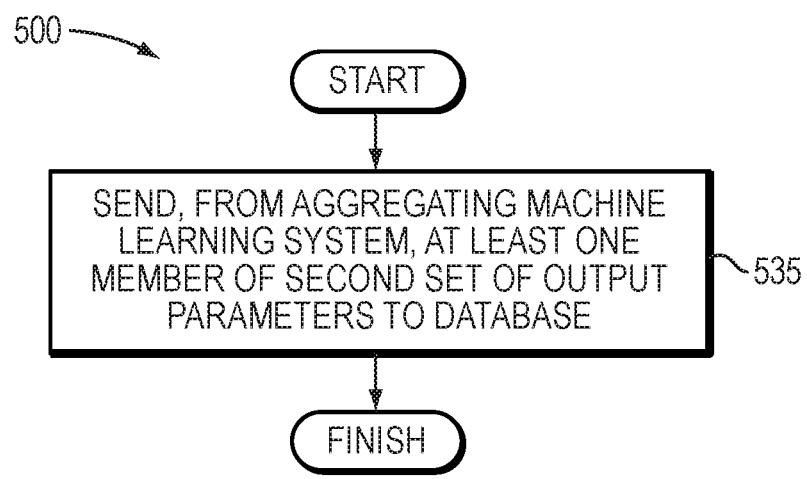
FIG. 5C is a flow diagram illustrating an example process, in accordance with an embodiment of the present disclosure.

FIGS. 5A, 5B, 5C, and/or 5D illustrate a flow diagram 500 illustrating an example embodiment of a method that may be used in connection with performing the techniques described herein, for example for data reduction improvement using aggregated self-training of machine learning systems associated with one or more storage arrays, in accordance with one or more embodiments. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIGS. 5A, 5B, 5C, and/or 5D and described below is not intended to be limiting.

In some embodiments, method 500 may be implemented in one or more processing devices (e.g., a digital processor, an analog processor, a digital circuit designed to process information, an analog circuit designed to process information, a state machine, a virtual machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

FIG. 5A illustrates method 500, in accordance with one or more embodiments. An operation 505 may include receiving, by an aggregating machine learning system (e.g., the aggregating neural network 405 (FIG. 4)), from one or more machine learning systems (e.g., the one or more local neural networks 420a-e (FIG. 4)), associated with a set of one or more storage arrays (e.g., the one or more data storages 415a-e (FIG. 4)), a first set of output parameters (e.g., from the one or more output nodes 430a-e of the one or more local neural networks 420a-e (FIG. 4)) indicative of performance metrics (e.g., CR, DR, DRR, and the like) for the set of the one or more storage arrays. Operation 505 may be performed by one or more hardware or virtual processors configured by machine-readable instructions, in accordance with one or more embodiments.

An operation 510 may include aggregating, by the aggregating machine learning system, the first set of output parameters, resulting in a second set of output parameters. Operation 510 may be performed by one or more hardware or virtual processors configured by machine-readable instructions, in accordance with one or more embodiments.

An operation 520 may include sending, from the aggregating machine learning system (e.g., from the one or more output nodes 440a-d of the aggregating neural network 405 (FIG. 4)), at least one member of the second set of output parameters as an input (e.g., to the one or more input nodes 425a-e of the one or more local neural networks 420a-e (FIG. 4)) to at least one of the one or more machine learning systems associated with the set of the one or more storage arrays. Operation 520 may be performed by one or more hardware or virtual processors configured by machine-readable instructions, in accordance with one or more embodiments.

FIG. 5B illustrates method 500, in accordance with one or more embodiments. An operation 525 may include adding an additional storage array (e.g., data storage 415a (FIG. 4)) to the set of the one or more storage arrays (e.g., data storages 415b-e (FIG. 4)). The additional storage array may be associated with an additional machine learning system (e.g., the local neural network 420a (FIG. 4)). The additional machine learning system may have an additional set of output parameters indicative of performance metrics for the associated additional storage array. Operation 525 may be performed by one or more hardware or virtual processors configured by machine-readable instructions, in accordance with one or more embodiments.

An operation 530 may include preventing the aggregating machine learning system from aggregating the additional set of output parameters until the at least one of the additional output parameters from the additional set of output parameters reaches a threshold condition. Operation 530 may be performed by one or more hardware or virtual processors configured by machine-readable instructions, in accordance with one or more embodiments.

FIG. 5C illustrates method 500, in accordance with one or more embodiments. An operation 535 may include sending, from the aggregating machine learning system, at least one member of the second set of output parameters to a database. Operation 535 may be performed by one or more hardware or virtual processors configured by machine-readable instructions, in accordance with one or more embodiments.

Figure 5D:
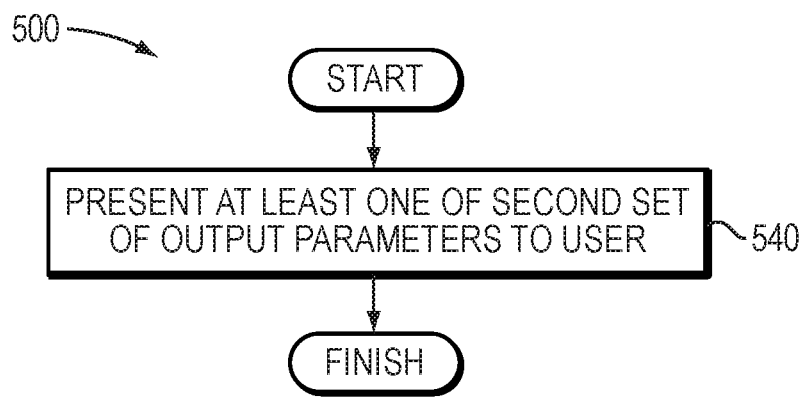
FIG. 5D is a flow diagram illustrating an example process, in accordance with an embodiment of the present disclosure.

FIG. 5D illustrates method 500, in accordance with one or more embodiments. An operation 540 may include presenting at least one of the second set of output parameters to a user. Operation 540 may be performed by one or more hardware or virtual processors configured by machine-readable instructions, in accordance with one or more embodiments.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
receiving, by an aggregating machine learning system from one or more machine learning systems associated with a set of one or more storage arrays, a first set of output parameters indicative of performance metrics for the set of the one or more storage arrays;
aggregating, by the aggregating machine learning system, the first set of output parameters, resulting in a second set of output parameters; and
sending, from the aggregating machine learning system, at least one member of the second set of output parameters as an input to at least one of the one or more machine learning systems associated with the set of the one or more storage arrays.

2. The method of claim 1, wherein the first set of output parameters include one or more of compression rate, deduplication rate, and aggregate data reduction rate.

3. The method of claim 1, wherein the set of the one or more storage arrays include storage arrays of at least two different types.

4. The method of claim 1, wherein the at least one of the values of the first set of output parameters reflects actual behavior of one or more applications associated with the set of the one or more storage arrays.

5. The method of claim 1, wherein the first set of output parameters reflect an estimation by the one or more machine learning systems associated with the set of one or more storage arrays of the performance of the set of one or more storage arrays.

6. The method of claim 1, further comprising:
adding an additional storage array to the set of the one or more storage arrays, wherein the additional storage array is associated with an additional machine learning system, wherein the additional machine learning system has an additional set of output parameters indicative of performance metrics for the associated additional storage array; and
preventing the aggregating machine learning system from aggregating the additional set of output parameters until the at least one of the additional output parameters from the additional set of output parameters reaches a threshold condition.

7. The method of claim 1, further comprising:
sending, from the aggregating machine learning system, at least one member of the second set of output parameters to a database.

8. A system, comprising:
an aggregating machine learning system; and
computer-executable program logic operating in memory, wherein the computer executable logic program enables execution across one or more processors of:
receiving, by the aggregating machine learning system from one or more machine learning systems associated with a set of one or more storage arrays, a first set of output parameters indicative of performance metrics for the set of the one or more storage arrays;
aggregating, by the aggregating machine learning system, the first set of output parameters, resulting in a second set of output parameters; and
sending, from the aggregating machine learning system, at least one member of the second set of output parameters as an input to at least one of the one or more machine learning systems associated with the set of the one or more storage arrays.

9. The system of claim 8, wherein the first set of output parameters include one or more of compression rate, deduplication rate, and aggregate data reduction rate.

10. The system of claim 8, wherein the set of the one or more storage arrays include storage arrays of at least two different types.

11. The system of claim 8, wherein the at least one of the values of the first set of output parameters reflects actual behavior of one or more applications associated with the set of the one or more storage arrays.

12. The system of claim 8, wherein the first set of output parameters reflect an estimation by the one or more machine learning systems associated with the set of one or more storage arrays of the performance of the set of one or more storage arrays.

13. The system of claim 8, wherein the computer executable logic program further enables execution across the one or more processors of:
adding an additional storage array to the set of the one or more storage arrays, wherein the additional storage array is associated with an additional machine learning system, wherein the additional machine learning system has an additional set of output parameters indicative of performance metrics for the associated additional storage array; and
preventing the aggregating machine learning system from aggregating the additional set of output parameters until the at least one of the additional output parameters from the additional set of output parameters reaches a threshold condition.

14. The system of claim 8, wherein the computer executable logic program further enables execution across the one or more processors of:
sending, from the aggregating machine learning system, at least one member of the second set of output parameters to a database.

15. A computer program product, comprising:
a non-transitory computer readable medium encoded with computer executable program code, the code enabling execution across one or more processors of:
receiving, by an aggregating machine learning system from one or more machine learning systems associated with a set of one or more storage arrays, a first set of output parameters indicative of performance metrics for the set of the one or more storage arrays;
aggregating, by the aggregating machine learning system, the first set of output parameters, resulting in a second set of output parameters; and
sending, from the aggregating machine learning system, at least one member of the second set of output parameters as an input to at least one of the one or more machine learning systems associated with the set of the one or more storage arrays.

16. The computer program product of claim 15, wherein the first set of output parameters include one or more of compression rate, deduplication rate, and aggregate data reduction rate.

17. The computer program product of claim 15, wherein the set of the one or more storage arrays include storage arrays of at least two different types.

18. The computer program product of claim 15, wherein the at least one of the values of the first set of output parameters reflects actual behavior of one or more applications associated with the set of the one or more storage arrays.

19. The computer program product of claim 15, wherein the first set of output parameters reflect an estimation by the one or more machine learning systems associated with the set of one or more storage arrays of the performance of the set of one or more storage arrays.

20. The computer program product of claim 15, the code is further enabling execution across the one or more processors of:
adding an additional storage array to the set of the one or more storage arrays, wherein the additional storage array is associated with an additional machine learning system, wherein the additional machine learning system has an additional set of output parameters indicative of performance metrics for the associated additional storage array; and
preventing the aggregating machine learning system from aggregating the additional set of output parameters until the at least one of the additional output parameters from the additional set of output parameters reaches a threshold condition.

* * * * *